United States Patent [19]  
Eichenauer et al.

[11] Patent Number: 5,028,349
[45] Date of Patent: Jul. 2, 1991

[54] MOULDING COMPOSITIONS HAVING UNIFORM PARTICLE SIZE AND IMPROVED THERMAL STABILITY

[75] Inventors: Herbert Eichenauer, Dormagen; Alfred Pischtschan, Kuerten; Karl-Heinz Ott, Leverkusen, all of Fed. Rep. of Germany

[73] Assignee: Bayer Aktiengesellschaft, Leverkusen, Fed. Rep. of Germany

[21] Appl. No.: 175,053

[22] Filed: Mar. 30, 1988

Related U.S. Application Data

[63] Continuation of Ser. No. 827,403, Feb. 10, 1986, abandoned.

[30] Foreign Application Priority Data

Feb. 20, 1985 [DE] Fed. Rep. of Germany ....... 3505749

[51] Int. Cl.⁵ .................... C08G 63/48; C08G 63/91; C08G 51/04; C08G 55/02
[52] U.S. Cl. ........................................ 525/72; 525/73; 525/315; 525/316
[58] Field of Search ........................... 525/316, 73, 72

[56] References Cited

U.S. PATENT DOCUMENTS 3,047,534  7/1962  Dyer et al. ..................... 525/316
3,627,855 12/1967  Schott et al. .................. 525/316
3,786,115  1/1974  Osuga et al. ................... 525/316
4,233,418 11/1980  Linger et al.

FOREIGN PATENT DOCUMENTS 121854 10/1984 European Pat. Off.
121855 10/1984 European Pat. Off.

OTHER PUBLICATIONS

German Industrial Standards; DIN 4188.
German Industrial Standards; DIN 53460.
Wittfoht's "Plastics Technical Dictionary."
Neumuller's "Rompps Chemi-Lexikon".
Carlowitz's "Tabellarische Ubersicht uber die Prufung von Kunstoffen".

Primary Examiner—Jacob Ziegler
Attorney, Agent, or Firm—Connolly and Hutz

[57] ABSTRACT

Elastic-thermoplastic or thermoplastic powder-form moulding compositions having uniform particles size and improved thermal stability and processes for their manufacture.

5 Claims, No Drawings

MOULDING COMPOSITIONS HAVING UNIFORM PARTICLE SIZE AND IMPROVED THERMAL STABILITY

This is a continuation of application Ser. No. 827,403 filed Feb. 10, 1986, now abandoned.

This invention relates to elastic-thermoplastic and to thermoplastic powder-form compositions having uniform particle size and improved thermal stability.

Aqueous polymer latices are normally converted into polymer powders by initiating the coagulation of the latex particles by addition of aqueous salt solutions or dilute acids.

Unfortunately, the coagulated powders generally are obtained with a wide particle size distribution. This gives rise to disadvantages, including, for example, the danger of dust explosions caused by an excessive percentage of fines and problems during storage, transport and mixing with other powder-form or granular polymers.

Possible methods for reducing the percentage of fines are described, for example, in U.S. Pat. Nos. 3,248,455; 3,249,569 and 3,345,430, according to which either small quantities of water-soluble non-ionic polymers, such as polyethylene oxide, are added to the latex during coagulation or coagulation is carried out using highly concentrated solutions of the coagulant to form a paste-like coagulate.

Apart from an excessive percentage of fines, however, an excessive proportion of coarse-grained powder may also give rise to disadvantages, for example by the inclusion of precipitant which is very difficult to wash out. One possible method of reducing the percentage of coarse particles is the process described in Deutsche Auslegeschrift 1,958,498 in which the polymer dispersion and precipitant are intensively mixed under conditions of high turbulence.

Unfortunately, in these processes only the coarse component or only the fine component is reduced and they need complicated equipment. In addition, the thermooxidative behaviour of the resulting polymer powder is not simultaneously improved.

The present invention relates to improved elastic-thermoplastic and to improved thermoplastic powder-form moulding compositions having uniform particle size and improved thermal stability which are obtained by mixing the latex of a moulding composition with from 0.75 to 10 parts by weight (per 100 parts by weight of solids in the latex), preferably from 1 to 8 parts by weight, more preferably from 1.5 to 5 parts by weight, of a sulphur containing elastic-thermoplastic graft product in emulsion form of thermoplastic resin-forming monomers onto a rubber the thermoplastic compound thereof having a Vicat A/120 softening temperature according to DIN 53460 of from 30° to 95° C., preferably from 40° to 75° C., and a sulphur content introduced by incorporated, optionally substituted thioalkyl groups of from 0.5 to 5.0% by weight, preferably from 0.8 to 3.5%, by weight, and precipitating the mixture by the addition of coagulating agents at temperatures of from 75° to 120° C., preferably from 80° to 100° C., optionally under pressure, and recovering the polymer mixture.

Determination of Vicat A/120 softening temperature according to DIN 53460 involves determination of the temperature in degree Celsius at which a standard indenting tool tip penetrates a test specimen to a depth of 1 millimeter when the temperature is raised at a uniform rate of 120K/h.

The moulding compositions of this invention are free-flowing powders of uniform particle size with low content of fine or coarse particles; they show improved thermal stability in the presence of air.

Sulphur containing elastic-thermoplastic graft products in emulsion form suitable for the present invention are those having a Vicat A/120 softening temperature according to DIN 53460 of the thermoplastic component i.e. of the monomers polymerized onto the rubber from 30° to 95° C., preferably those having a Vicat A/120 softening temperature of the thermoplastic component of from 40° to 75° C.

The polymers have a sulphur content of from 0.5 to 5.0% by weight, preferably from 0.8 to 3.5% by weight, the sulphur being introduced by incorporated, optionally substituted thioalkyl groups.

The sulphuric containing graft products present are prepared in latex form by emulsion polymerization of vinyl monomers in the presence of a particulate rubbe generally having an average particle diameter ($d_{50}$) of from 0.05 to 20.0 μm, preferably from 0.1 to 1.0 μm, and a glass transition temperature of <10° C. Examples of suitable rubbers are polybutadiene, polyisoprene, styrene-butadiene copolymers, acrylonitrile-butadiene copolymers, acrylate rubbers, EPM rubbers (ethylene/propylene rubbers) and EPDM rubbers (ethylene/propylene/diene rubbers containing as diene small quantities of an unconjugated diene, such as 1,5-hexadiene or norbornadiene). The advantage particle diameters are determined by ultracentrifuge measurements (cf. W. Scholtan, H. Lange: Kolloid-Z. und Z. Polymere 250, pp. 782–798 (1972)).

The vinyl monomers used are of the type which form thermoplastic resins when polymerized, for example, aromatic vinyl compounds corresponding to the following general formula (I) or compounds corresponding to the following general formula (II) and mixtures thereof:

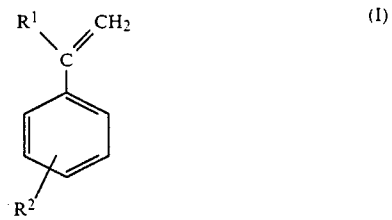

In general formulae (I) and (II), $R^1$ represents hydrogen atom or methyl; $R^2$ represents hydrogen or halogen or alkyl containing from 1 to 3 carbon atoms in the ortho, meta or para position; $R^3$ represents hydrogen or methyl; and X represents a cyano (CN), ester ($COOR^4$) or amide group ($CONR^5R^6$) wherein $R^4$ represents hydrogen or $C_1$–$C_4$ alkyl; and $R^5$ and $R^6$ independently represent hydrogen, phenyl or alkyl containing from 1 to 4 carbon atoms.

Examples of compounds corresponding to general formula (I) are styrene, α-methylstyrene, p-methylstyrene and vinyl toluene. Examples of compounds corresponding to general formula (II) are acrylonitrile, methacrylonitrile methylacrylate and methylmethacrylate.

Other suitable monomers are, for example, vinyl acetate or N-phenylmaleic imide.

Preferred monomers are mixtures of styrene and acrylonitrile and also mixtures of styrene, acrylonitrile and methyl methacrylate.

These monomers are graft polymerized onto the rubber in the presence of one or more compounds containing mercapto groups. Suitable mercapto compounds are, for example, alkyl mercaptans containing from 1 to 18 carbon atoms, mercaptocarboxylic acids and esters thereof containing from 1 to 6 carbon atoms in the alcohol moiety, $C_2$–$C_{12}$ mercapto-alcohols or $C_{10}$–$C_{20}$ arylalkyl mercaptans.

The amount of mercapto compound is selective so that Vicat A/120 softening temperatures are achieved within the range specified above.

Preferred mercaptans are t-dodecyl mercaptan and n-dodecyl mercaptan and mixtures thereof.

The graft products generally have a rubber content of from 1 to 80%, by weight, preferably from 10 to 60%, by weight, and gel contents, as measured in acetone at 25° C., of from 5 to 95% by weight, preferably from 20 to 80%, by weight. Preferred elastic-thermoplastic graft products prepared with addition of mercaptans are reaction products of:
(a) from 50 to 80 parts by weight of styrene and/or α-methylstyrene;
(b) from 10 to 30 parts by weight of acrylonitrile;
(c) from 7.5 to 25 parts by weight of t-dodecylmercaptan on
(d) from 10 to 200 parts by weight of polybutadiene.

The emulsion polymerization may be carried out using anionic emulsifiers, such as sodium, potassium or ammonium salts of long-chain fatty acids containing from 10 to 20 carbon atoms, for example potassium oleate, alkyl sulphates containing from 10 to 20 carbon atoms, alkylaryl sulphonates containing from 10 to 20 carbon atoms or alkali metal or ammonium salts of disproportionated abietic acid.

Suitable radical-forming initiators are organic and inorganic peroxides, inorganic persulphates, such as potassium persulphate, azo initiators, such as azobisisobutyronitrile and also Redox systems consisting of an oxidizing agent, preferably a peroxide, and a reducing agent. The polymerisation may be carried out at temperatures of from 30° to 100° C., preferably from 50° to 80° C. The preferred initiator is potassium persulphate.

The sulphur containing elastic-thermoplastic graft polymer latex is added to the elastic-thermoplastic or thermoplastic moulding compositions in latex form in quantities corresponding to from 0.75 to 10% by weight, preferably from 1 to 8%, by weight, more preferably from 1.5 to 5%, by weight, of polymer (based on total solids). The addition may be made at temperatures of from 10° to 80° C., preferably at about 20° C.

According to the present invention with elastic-thermoplastic or thermoplastic polymers present in the form of aqueous emulsions can be converted into powder-form moulding compositions having uniform particle size and improved thermal stability in the presence of air by mixing with the above-mentioned sulpho containing elastic-thermoplastic graft products in emulsion form and recovering the product.

Examples of suitable polymers in latex form are polystyrene, copolymers and terpolymers of optionally nucleus or side-chain-substituted styrene with other resin-forming monomers, such as (meth)acrylonitrile, methyl (meth)acrylate, α-methylstyrene, p-methylstyrene, vinyl toluene and other nucleus- or side-chain-substituted styrenes, N(cyclo)alkyl maleic imides, N(alkyl)-phenylmaleic imides, for example styrene/acrylonitrile copolymers, styrene/methyl methacrylate copolymers or α-methyl styrene/acrylonitrile copolymers and also the elastic-thermoplastic polymers obtained by polymerization of resin-forming unsaturated compounds in the presence of a rubber-elastic component, for example polybutadiene, polyisoprene or acrylate rubber.

Preferred are latex mixtures of a latex of an elastic-thermoplastic polymer, for example the graft product of a resin-forming monomer, (such as styrene, α-methylstyrene, p-methylstyrene, (meth)acrylonitrile or methyl (meth)acrylate or mixtures thereof) on polybutadiene or copolymers of butadiene with acrylonitrile and/or styrene and of a latex of a rigid and brittle component, for example a styrene or α-methylstyrene or p-methylstyrene/acrylonitrile copolymer.

Particularly preferred latices are latices of ABS polymers, for example having the following composition:
(A) from 5 to 100% by weight, preferably from 5 to 80% by weight, of a graft copolymer obtained by graft polymerization of:
  (1) from 10 to 95% by weight, preferably from 10 to 80% by weight of a mixture of:
    (a) from 50 to 90% by weight of styrene, alkylstyrene, methyl methacrylate or mixtures thereof.
    (b) from 50 to 10% by weight of acrylonitrile, alkyl acrylonitrile, alkyl methacrylate or mixtures thereof; on
  (2) from 90 to 5% by weight, preferably from 90 to 20% by weight of a polymer of a conjugated diolefin containing at least 80% by weight of copolymerized conjugated diolefin; and
(B) from 95 to 0% by weight, preferably from 95 to 20% by weight, of a thermoplastic copolymer of:
  (a) from 50 to 95% by weight of styrene, alkyl styrene, methyl methacrylate or mixtures thereof;
  (b) from 50 to 5% by weight of acrylonitrile, alkyl acrylonitrile, alkyl methacrylate or mixtures thereof;
the sum total of the resin-forming monomers (a) and (b) in components (A) and (B) together not being less than 40% by weight.

Powder-form ABS moulding compositions can be produced
(a) by mixing of emulsions of a graft polymer (A) and a copolymer (B) emulsion polymerization, with an emulsion of the sulphur containing elastic-thermoplastic graft product and
(b) by grafting all resin-forming monomers onto the rubber adding an emulsion of the sulphur containing elastic-thermoplastic graft product and coagulating the mixtures.

Dispersions of anti-oxidants can be added before coagulation. Emulsifiers suitable for this method (they have to allow for coagulation) are e.g. sodium, potassium or ammonium salts of long-chain fatty acids containing from 10 to 20 carbon atoms, alkyl sulphates containing from 10 to 20 carbon atoms, alkylaryl sulphonates containing from 10 to 20 carbon atoms and the alkali metal and ammonium salts of disproportionated abietic acid.

The coagulant to be used depends on the emulsifiers used to stabilize the emulsion. Emulsifiers which emulsify in the acidic and alkaline range (alkyl sulphates, alkylaryl sulphonates and alkyl sulphonates) preferably require electrolytes, such as calcium chloride, magnesium sulphate or aluminium sulphate in the form of aqueous solutions as precipitants. In the case of emulsifiers which have no emulsifying effect at pH values below 7, it is sufficient to use acids, such as acetic acid, for coagulation.

Where an aqueous solution is used as the precipitant, its concentration is preferably from 0.5 to 25% for electrolytes and from 0.5 to 90% for acids. Short-chain carboxylic acids, for example acetic acid, may also be used in pure form.

The quantity of precipitant is preferably from 0.01 to 20% of the solid polymer.

The coagulated powder-form moulding compositions ar worked-up by methods known from the literature, more especially by filtration or centrifugation and subsequent drying.

EXAMPLES

In the following Examples parts quoted are parts by weight and are based on solid constituents or polymerizable constituents.

EXAMPLE 1

Preparation of an elastic-thermoplastic graft product of a mixture of styrene, acrylonitrile and t-dodecyl mercaptan on polybutadiene present in emulsion form:

50 parts of polybutadiene (in the form of latex having a solids content of 25% by weight) having an average particle size of 0.4 μm are heated to 65° C. under nitrogen, after which 0.5 part of potassium persulphate (dissolved in 20 parts of water) is added. Thereafter, a mixture of 25.2 parts of styrene, 9.8 parts of acrylonitrile and 15 parts of t-dodecyl mercaptan and 2 parts of the sodium salt of disproportionated abietic acid (dissolved in 25 parts of water) are added over a period of 4 hours, the grafting reaction taking place. Following an after-reaction time, part of the latex is coagulated in a cold solution of magnesium sulphate in acetic acid. The polymer obtaint after drying in vacuo at 70° C. has a sulphur content of 2.25%.

The polymer is then extracted with methylethyl ketone for 24 hours in a Soxhlet apparatus. The solution is concentrated, after which the solvent is completely removed in vacuo. The polymer remaining has a Vicat A/120 softening temperature of 54° C. (as determined on a test specimen measuring 10 mm × 10 mm × 4 mm).

EXAMPLE 2

Preparation of an elastic-thermoplastic graft product of a mixture of styrene acrylonitrile and t-dodecyl mercaptan on polybutadiene present in emulsion form;

20 parts of polybutadiene (in the form of a latex having a solids content of 11.5%, by weight) having an average particle diameter of 0.4 μm are heated to 65° C. under nitrogen, after which 0.5 part of potassium persulphate (dissolved in 20 parts of water) is added. Thereafter, a mixture of 46,8 parts of styrene, 18.2 parts of acrylonitrile and 15 parts of t-dodecyl mercaptan and 2 parts of the sodium salt of disproportionated abietic acid (dissolved in 25 parts of water) are added over a period of 4 hours, the grafting reaction taking place. Following an after reaction time, part of the latex is coagulated in a cold solution of magnesium sulphate in acetic acid. The polymer obtained after drying in vacuo at 70° C. has a sulphur content of 2.3%.

The polymer is then extracted with methylethyl ketone for 24 hours in a Soxhlet apparatus. The solution is concentrated, after which the solvent is completely removed in vacuo. The polymer remaining has a Vicat A/120 softening temperature of 60° C. (as determined on a test specimen measuring 10 mm × 10 mm × 4 mm).

EXAMPLES 3 to 5

Preparation of elastic-thermoplastic powder-form moulding compositions:

After the addition of 1.2 parts of anti-oxidant (based on 100 parts of polymer solids), quantities of 900 g of a 33% graft polymer latex of 36 parts of styrene and 14 parts of acrylonitrile on 50 parts of polybutadiene, in the production of which 1.5 parts of sodium salt of disproportionated abietic acid was used as emulsifier, are mixed with the quantities indicated in Table 1 of the latx of Example 1 and Example 2, after which the latex mixture is added to a solution of 32 g of magnesium sulphate (MgSO$_4$.7H$_2$O) and 16 of acetic acid in 1.6 litres of deionized water in a precipitation vessel equipped with a propeller stirrer.

The mixture is heated to from 98° to 100° C., coagulating completely. After filtration of the precipitation mixture, the polymer is dried in vacuo at 70° C. and the particle size distribution determined by sieve analysis (see Table 1) using a test sieve machine equipped with vibratory sieves (manufacturers: Haver and Boecker) standardized in accordance with DIN 4188.

By such standardization, sieving media in test sieves shall be designated by teh nominal size of openings in the test sieve (central separation of opposite sides or diameter of openings).

TABLE 1

| | Particle size distribution of elastic-thermoplastic powder-form moulding compositions | | | | |
|---|---|---|---|---|---|
| | Quantity used of the latex of Example 1 [parts, by weight, of latex solids (latex Example 1) per 100 parts, by weight, of | Quantity used of the latex of Example 2 [parts, by weight, of latex solids (latex Example 2) per 100 parts, by weight, of | Particle size distribution [%] | | |
| Example No. | latex solids to be coagulated] | latex solids to be coagulated] | >1 mm | 1–0.1 mm | <0.1 mm |
| 3 (comparison) | — | — | 23.50 | 41.08 | 35.42 |
| 4 (invention) | 7.5 | — | 2.43 | 76.32 | 21.25 |
| 5 (invention) | — | 5 | 3.71 | 90.05 | 6.24 |

EXAMPLE 6

Preparation of an elastic-thermoplastic powder-form moulding composition according to the present invention:

900 g of the graft polymer latex used in Examples 3 to 5 are mixed with 45 g of the latex of Example 1 without addition of anti-oxidant, after which the latex mixture is coagulated as in Examples 3 to 5 and converted to a dry polymer powder. The powder which has a particle size of from to 0.1 mm is tested for thermal stability by DSC measurements using a Perking-Elmer DSC 2 apparatus:

isothermal measurement at 160 µC (purging gas oxygen 3.6 l/h): induction time to maximum oxidation rate = 35.3 mins. dynamic measurement (purging gas oxygen 3.6 l/h, heating rate 20° K/min.): maximum of the exothermic reaction at T = 211° C.

EXAMPLE 7

Preparation of a comparison elastic-thermoplastic powderform moulding composition:

900 g of the graft polymer latex described in Examples 3 to 5 are coagulated as in Exampls 3 to 5 without addition of anti-oxidant and without addition of the latex of Example 1 and converted into dry polymer powder. The powder which has a particle size of from 1 to 0.1 mm is tested for thermal stability by DSC measurements using a Perkin-Elmer DSC 2 apparatus.

isothermal measurement at 160° C. (purging gas oxygen 3.6 l/h): induction time to maximum oxidation rate = 2.7 mins.

dynamic measurement (purging gas oxygen 3.6 l/h, heating rate 20° K/min): maximum of the exothermic reaction at T = 185° C.

We claim:

1. Elastic-thermoplastic and thermoplastic powderform moulding composition produced by the process which comprises
   providing a latex of a moulding composition containing from 0.75 to 10 parts by weight, based on 100 parts by weight of latex solids, of a thio group-containing elastic-thermoplastic graft polymer in emulsion form comprising thermoplastic resin forming monomers grafted onto a rubber wherein the thermoplastic component has a Vicat A/120 softening temperature of from 30° to 95° C. and a sulphur content of 0.5 to 5.0% by weight as thioalkyl groups
   and precipitating the moulding composition mixture by addition of coagulating agents at from 75° to 120° C. and recovering the polymer mixture.

2. Composition according to claim 1 wherein from 1 to 8 parts by weight of sulphur containing thermoplastic graft polymer is used.

3. Composition according to claim 1, wherein the sulphur content is from 0.8 to 3.5% by weight.

4. Composition according to claim 1 wherein the sulphur-containing elastic-thermoplastic graft polymer is a reaction product of styrene, α-methylstyrene, p-methylstyrene, vinyl toluene, (meth)acrylonitrile, methyl(meth)acrylate, N-phenyl maleic imide or a mixture thereof and a mercapto group-containing compound in the presence of a rubber having a glass transition temperature of <10° C.

5. Composition according to claim 1 wherein the sulphur-containing elastic-thermoplastic graft polymer is a reaction product of:
   (a) from 50 to 80 parts by weight of styrene and/or α-methylstyrene:
   (b) from 10 to 30 parts by weight of acrylonitrile: and
   (c) from 7.5 to 25 parts by weight of t-dodecyl mercaptan; on
   (d) from 10 to 200 parts by weight of polybutadiene.

* * * * *